UNITED STATES PATENT OFFICE.

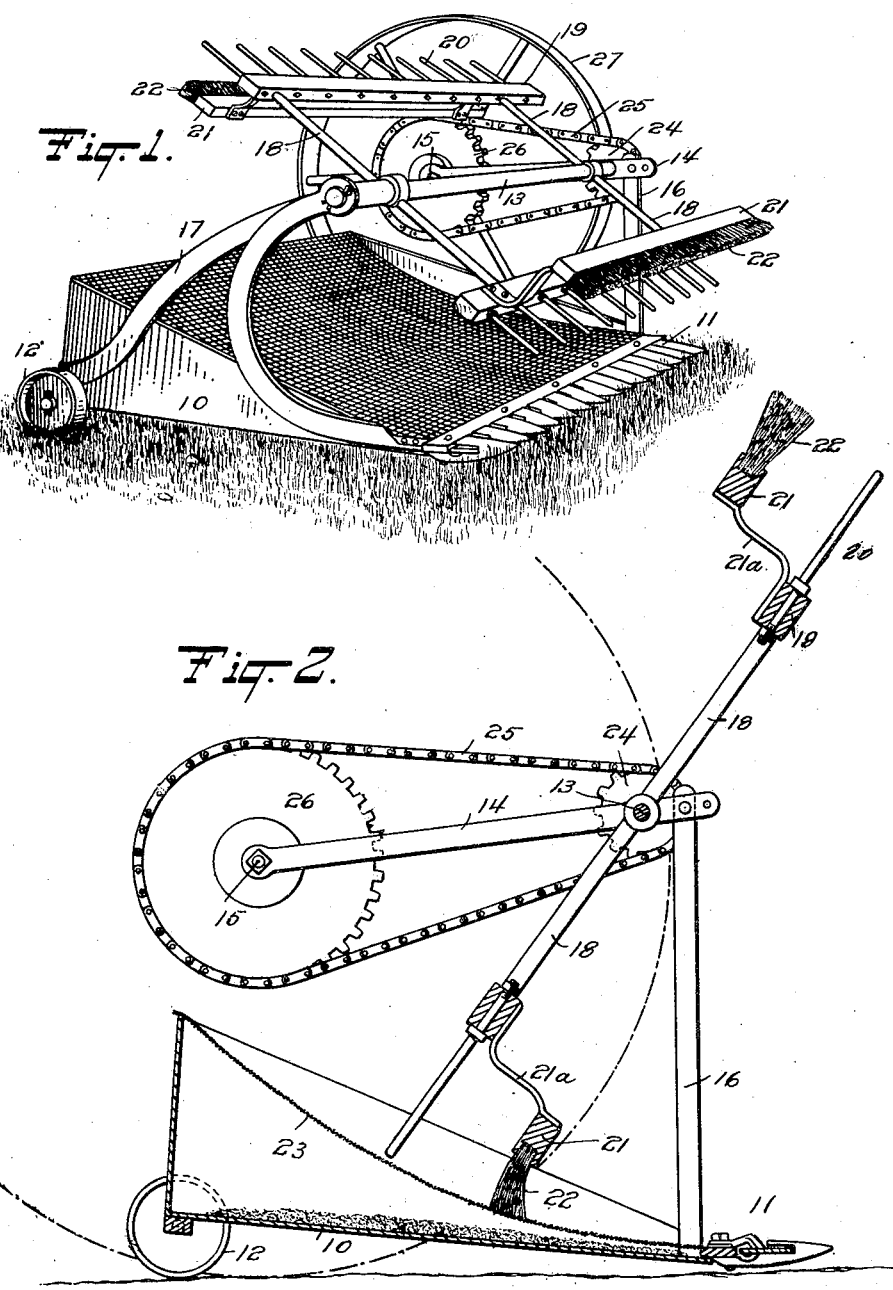

VINCENT M. JACKSON, OF LAUREL HILL, LOUISIANA.

SEED-GATHERING ATTACHMENT FOR MOWERS.

1,071,554.  Specification of Letters Patent.  Patented Aug. 26, 1913.

Application filed April 26, 1913. Serial No. 763,768.

*To all whom it may concern:*

Be it known that I, VINCENT M. JACKSON, a citizen of the United States, and a resident of Laurel Hill, in the parish of West Feliciana and State of Louisiana, have invented a new and Improved Seed-Gathering Attachment for Mowers, of which the following is a full, clear, and exact description.

My invention relates to a seed gathering attachment for mowing machines arranged to have support from the finger bar of the mower, to be adjustable vertically of the latter, a frame member of the attachment being adapted for mounting on the axle of the mower so that in the adjustment of the finger bar, the attachment will swing with the said axle as a center, there being a beater reel operating over the seed box and driven from the said axle.

The invention will be particularly explained in the specific description following.

Reference is to be had to the accompanying drawings forming a part of this specification, in which similar characters of reference indicate corresponding parts in both the views.

Figure 1 is a perspective view of the attachment, the view including a wheel and axle of the mower, and the finger bar thereof; and Fig. 2 is a longitudinal vertical section.

In constructing an attachment in accordance with my invention a seed box 10 is provided, which gradually deepens from the front end rearwardly. The front end of the seed box is secured by any suitable means to the finger bar 11 of the mower, and is provided with rear wheels 12. The reel shaft 13 is mounted at one end on an arm 14, the rear end of which is adapted to be supported on the axle 15 of the mower, while the front end of said arm is pivotally connected with a post or standard 16 that rises from the front end of the box 10. The opposite end of the shaft 13 is supported in a suitable frame or arm 17 on the outer side of the box 10. Radial arms 18 extend from the shaft 13 and carry cross bars 19, which preferably are provided with beater fingers 20, said bars and fingers moving, when rotated, over the box 10 and serving to engage the grass and press it down over the box as the latter advances in the rear of the finger bar 11. The beating of the grass serves to detach the seed, and co-acting with the beater members, brushes are employed, preferably one brush for each cross bar 19 and set of fingers 20. The brush may consist of a head 21 secured by arms 21ª to a bar 19, and having bristles 22 or their equivalent extending outwardly slightly beyond the ends of the fingers 20, so that the brushes will sweep the top 23 of the box. Said top consists of a suitable screen, preferably formed of wire mesh, which will permit the passage therethrough of the seed, while excluding the grass, the result being that as the reel beats down the grass onto the top 23, the follower brushes will press the seed through the said top and throw the grass over the rear edge of the box.

To rotate the reel shaft 13, the latter is provided with a sprocket wheel 24, over which a sprocket chain 25 runs, said chain running also over a sprocket wheel 26 rotating with the adjacent running wheel 27 of the mower, said wheel being shown conventionally in the present instance.

The described supporting means for the attachment, and the driving connections, permit of the box 10 and the frame elements and reel accommodating themselves to the usual vertical adjustment provided for the finger bar 11, the front end of the box rising and lowering with the finger bar, and the box rocking on its supporting rear running wheels 12, while the inner arm 14 will swing with the axle 15 as a center, and its outer end have pivotal movement relatively to the supporting standard 16.

The screen top 23 is concaved and its curvature preferably is such that the brush 22 will sweep in direct contact with the said top from the front of the top to a point short of the rear end, so that the brush will leave the top before reaching the rear end of the latter, thereby giving any seed remaining on the top a tendency to return by gravity and roll over the top toward the front end so that the seed will either fall through the openings in the top, or be brushed therethrough by successive actions of the brushes.

It will be observed that the attachment is of exceedingly simple construction and readily applied and removed, as required.

Having thus described my invention, I claim as new, and desire to secure by Letters Patent;

1. A seed gathering attachment for mowers, comprising a seed box adapted for connection at its front end with the finger bar of a mower, said box having a concaved screen top and deepening toward the rear end, running wheels at the rear end of the box, frame members rising from the box at the outside thereof and at the inner side, an arm extending from the frame member at the inner side and pivotally connected thereto and adapted at its rear end for support on the axle of the mower, a reel shaft supported on the outer frame member and on the said arm, a reel on said shaft, means for revolving the shaft from a rotary part of the mower, the reel having beater members moving in a path adjacent to the screen top of the seed box, and brushes on the reel traveling in the rear of the beater members and adapted for sweeping contact with the said top.

2. A seed gathering attachment for mowers, comprising a seed box adapted at its front end for attachment with the finger bar of a mower, and deepening at its rear end, said box having a concaved screen top, frame members, a reel supported on said frame members and having beater elements movable in a path adjacent to the concaved top of the seed box, the frame members including an arm adapted at its rear end for support on the axle of a mower to swing thereon, and means for revolving the reel from a rotary part of the mower.

3. A seed gathering attachment for mowers, comprising a frame, a seed box connected with the lower end of the frame, said seed box having a concaved screen top, a reel mounted in said frame and having beater members movable in a path adjacent to the concaved top of the seed box, means for supporting said frame from a mower, and means for driving the reel from a rotary part of the mower.

4. A seed gathering attachment for mowers, comprising a frame, a seed box connected with the lower end of the frame, said seed box having a concaved screen top, a reel mounted in said frame and having beater members movable in a path adjacent to the concaved top of the seed box, means for supporting said frame from a mower, and means for driving the reel from a rotary part of the mower, said reel having brushes following the beater elements and adapted for contact with the concaved top of the seed box.

In testimony whereof I have signed my name to this specification in the presence of two subscribing witnesses.

VINCENT M. JACKSON.

Witnesses:
J. R. MATTHEWS,
D. NORWOOD.

---

Copies of this patent may be obtained for five cents each, by addressing the "Commissioner of Patents, Washington, D. C."